(12) United States Patent
Pintar

(10) Patent No.: US 10,139,184 B1
(45) Date of Patent: Nov. 27, 2018

(54) WEAPON SECURITY APPARATUS

(71) Applicant: Blac-Rac Manufacturing, Inc., Boise, ID (US)

(72) Inventor: Kevin B. Pintar, Meridian, ID (US)

(73) Assignee: BLAC-RAC MANUFACTURING, INC., Boise, ID (US)

( * ) Notice: Subject to any disclaimer, the term of this patent is extended or adjusted under 35 U.S.C. 154(b) by 0 days.

(21) Appl. No.: 15/837,209

(22) Filed: Dec. 11, 2017

(51) Int. Cl.
*F41A 23/18* (2006.01)
*F41A 17/02* (2006.01)

(52) U.S. Cl.
CPC ............. *F41A 23/18* (2013.01); *F41A 17/02* (2013.01)

(58) Field of Classification Search
CPC ........ F41A 23/00; F41A 23/005; F41A 23/18; F41A 17/00; F41A 17/02; F41A 17/04
USPC .................................. 42/94, 70.11; 89/37.04
See application file for complete search history.

(56) References Cited

U.S. PATENT DOCUMENTS

| | | | | |
|---|---|---|---|---|
| 1,513,267 A * | 10/1924 | Parks | ....................... | F41A 17/02 42/70.11 |
| 2,316,995 A * | 4/1943 | Smith | ................... | A47B 81/005 211/64 |
| 2,427,365 A * | 9/1947 | Meister | ................... | F41A 23/16 269/152 |
| 2,870,683 A * | 1/1959 | Wilson | ..................... | F41A 23/12 42/94 |
| 3,473,673 A * | 10/1969 | Porter | ................... | A47B 81/005 211/64 |
| 4,841,839 A * | 6/1989 | Stuart | ..................... | F41A 23/16 269/220 |
| 5,081,782 A * | 1/1992 | Wright | .................... | F41A 23/16 42/94 |
| 5,138,786 A * | 8/1992 | Fischer | ................... | E05B 73/00 211/64 |
| 5,339,966 A * | 8/1994 | Bastiaans | ............. | A47B 81/005 211/4 |
| 5,375,804 A * | 12/1994 | Levilly | ................... | F41A 23/16 248/286.1 |
| 5,561,935 A * | 10/1996 | McCarthy | ............... | F41A 17/54 42/70.07 |
| 5,621,996 A * | 4/1997 | Mowl, Jr. | ............... | F41A 23/18 211/64 |
| 5,903,645 A * | 5/1999 | Tsay | ..................... | B60R 11/0241 248/316.4 |
| 5,918,402 A * | 7/1999 | Weinraub | ................ | F41A 17/54 42/70.07 |
| 5,979,846 A * | 11/1999 | Fluhr | ........................ | B60R 7/14 211/64 |
| 6,142,313 A * | 11/2000 | Young | ..................... | F41A 17/02 211/4 |
| 6,260,299 B1 * | 7/2001 | Jordan | ................. | A47B 81/005 42/70.07 |
| 6,330,815 B1 * | 12/2001 | Duncan | ..................... | B60R 7/14 211/4 |

(Continued)

*Primary Examiner* — Derrick R Morgan
(74) *Attorney, Agent, or Firm* — Parsons Behle & Latimer

(57) ABSTRACT

A firearm security apparatus may include a base assembly and a locking assembly having a first plate and a second plate. The second plate may be moveable between an open position and a closed position relative to the first plate. The first plate and the second plate may be configured to receive a weapon therebetween, where the first plate, the second plate, or both have a window defined therein to form a C-shape having a first member that engages the weapon above a grip and having a second member that engages the weapon below the grip when the second plate is in the closed position.

17 Claims, 4 Drawing Sheets

(56) References Cited

U.S. PATENT DOCUMENTS

| | | | | |
|---|---|---|---|---|
| 6,601,332 B1* | 8/2003 | Riebling | F41A 17/54 | 42/70.11 |
| 6,845,640 B2* | 1/2005 | Loeff | E05B 53/003 | 109/45 |
| 7,367,150 B2* | 5/2008 | Farchione | F41A 17/54 | 42/70.07 |
| 7,658,028 B2* | 2/2010 | Pintar | F41A 17/02 | 42/70.06 |
| 8,006,426 B1* | 8/2011 | Carroll | F41A 23/14 | 42/94 |
| 8,266,835 B2* | 9/2012 | Pintar | F41A 17/02 | 42/70.06 |
| 9,010,007 B2* | 4/2015 | Chandler | F41A 17/04 | 206/315.11 |
| 9,482,482 B1* | 11/2016 | Sanders | E05B 73/00 | |
| 9,534,867 B2* | 1/2017 | Dunn | F41C 33/06 | |
| 9,976,693 B1* | 5/2018 | Delikat | F16M 11/14 | |
| 2002/0133998 A1* | 9/2002 | Murray | F41A 17/54 | 42/70.07 |
| 2004/0148840 A1* | 8/2004 | Jean Levilly | F41A 23/16 | 42/94 |
| 2005/0145585 A1* | 7/2005 | Pintar | A47B 81/005 | 211/64 |
| 2007/0051026 A1* | 3/2007 | Vor Keller | F41A 17/02 | 42/70.11 |
| 2010/0107465 A1* | 5/2010 | Pintar | F41A 17/02 | 42/70.07 |
| 2010/0301184 A1* | 12/2010 | Stabler | F16M 11/16 | 248/346.5 |
| 2012/0222344 A1* | 9/2012 | Werner | F41A 23/16 | 42/94 |
| 2015/0260480 A1* | 9/2015 | Dunn | F41C 33/06 | 42/70.11 |
| 2016/0108942 A1* | 4/2016 | Yu | F16M 13/00 | 248/316.4 |

* cited by examiner

WEAPON SECURITY APPARATUS

FIELD OF THE DISCLOSURE

This disclosure relates generally to weapon security apparatuses and more particularly to weapon security apparatuses that accommodate extensions attached to weapons.

BACKGROUND

Typical gun security systems, such as gun racks, prevent the unauthorized access to a weapon by locking key portions of the weapon, thereby neutralizing it while in the security system. Examples of weapon security systems are described with reference to U.S. patent application Ser. No. 15/264,777, filed Sep. 14, 2016 and entitled "Systems and Methods to Prevent Hot-Wiring of Electronic Gun Racks," with reference to U.S. Pat. No. 8,266,835 filed on Jan. 6, 2010 and entitled "Firearm Security Device," and with reference to U.S. Pat. No. 7,658,028 filed on Jan. 30, 2008 and entitled "Firearm Security Device," the contents of each of which are hereby incorporated by reference in their entirety.

Typical gun mounting security systems may fit closely around a weapon's receiver and, as such, may not accommodate any extensions (e.g., a side saddle) that may be attached to the weapon. Such extensions must typically be removed before locking the gun in the security system. Further, typical gun mounting security systems may not fully support the weight of a weapon at the locking portion and may further require a butt plate, or some other structure, to support the weapon from underneath. Other disadvantages may exist.

SUMMARY

The present disclosure addresses at least some of the potential disadvantages of typical weapon security apparatuses. For example, a weapon security apparatus may include a set of plates that have a C-shape to accommodate extensions or attachments attached to a weapon while the weapon is secured by the security apparatus. The C-shape may also accommodate different types of weapons, e.g., a shotgun, a rifle, etc. The weapon security apparatus may apply pressure to a weapon between the set of plates to grip the barrel, the magazine tube, the receiver, or a combination thereof. The weapon security apparatus may further include an over-center linkage to apply constant pressure to the weapon.

In an embodiment, a firearm security apparatus includes a base assembly and a locking assembly having a first plate and a second plate, the second plate moveable between an open position and a closed position relative to the first plate, the first plate and the second plate configured to receive a weapon therebetween, where the first plate, the second plate, or both have a window defined therein to form a C-shape having a first member that engages the weapon above a grip and having a second member that engages the weapon below the grip when the second plate is in the closed position.

In some embodiments, the first plate and the second plate are configured to hold a weapon without a structure positioned directly beneath a butt portion of the weapon. In some embodiments, the window is sufficiently large to accommodate, between the first member and the second member, a side saddle extension mounted to a weapon. In some embodiments, a distance between the first plate and the second plate while the second plate is in the closed position is adjustable to accommodate different sized weapons. In some embodiments, the apparatus includes a handle configured to enable a user to move the second plate between the open position and the closed position. In some embodiments, the handle includes an over-center linkage configured to apply continuous pressure to a weapon between the first plate and the second plate when the second plate is in the closed position. In some embodiments, the apparatus includes a structural post coupled to one of the first or second plates, the structural post configured to engage a handle of a weapon thereon when the weapon is positioned between the first plate and the second plate, and when the second plate is in the closed position. In some embodiments, the first plate and the second plate are comprised of stainless steel. In some embodiments, the apparatus includes at least one synthetic rubber mount pad attached to the first plate, the second plate, or both.

In an embodiment, a method for firearm security includes providing a first plate and providing a second plate, the second plate moveable between an open position and a closed position relative to the first plate, the first plate and the second plate configured to receive a weapon therebetween, wherein the first plate, the second plate, or both have a window defined therein to form a C-shape.

In some embodiments, the first plate and the second plate are configured to hold a weapon without a structure positioned directly beneath and in contact with a butt portion of the weapon. In some embodiments, the window is sufficiently large to accommodate a side saddle extension mounted to a weapon. In some embodiments, a distance between the first plate and the second plate while the second plate is in the closed position is adjustable to accommodate different sized weapons.

In some embodiments, the method includes providing a handle configured to enable a user to move the second plate between the open position and the closed position. In some embodiments, the handle includes an over-center linkage configured to apply continuous pressure to a weapon between the first plate and the second plate when the second plate is in the closed position. In some embodiments, the method includes providing a structural post coupled to the first plate or the second plate, the structural post configured to receive a handle of a weapon thereon when the weapon is positioned between the first plate and the second plate, and when the second plate is in the closed position. In some embodiments, the first plate and the second plate include stainless steel. In some embodiments, the method includes providing a first synthetic rubber mount pad attached to the first plate and a second synthetic rubber mount pad attached to the second plate.

In an embodiment, a firearm security apparatus includes a first plate and a second plate, the second plate moveable between an open position and a closed position relative to the first plate, the first plate and the second plate configured to receive a weapon therebetween, where the first plate, the second plate, or both have a window defined therein to form a C-shape. The apparatus further includes a handle configured to enable a user to move the second plate between the open position and the closed position, wherein the handle includes an over-center linkage configured to apply continuous pressure to a weapon between the first plate and the second plate when the second plate is in the closed position.

In some embodiments, the apparatus includes a structural post coupled to the first plate or the second plate, the structural post configured to receive a handle of a weapon thereon when the weapon is positioned between the first plate and the second plate, and when the second plate is in the closed position.

Figure 1:
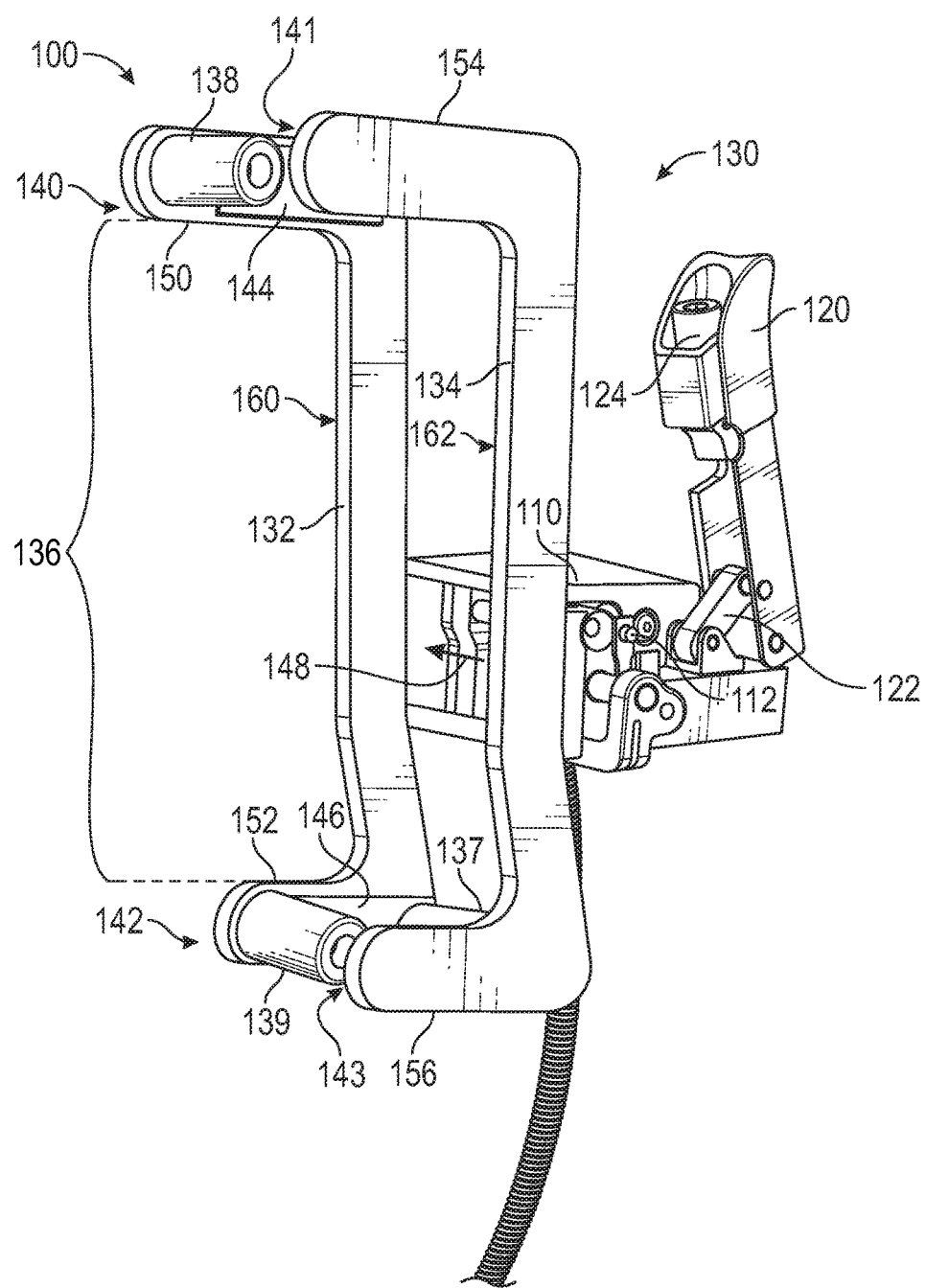
FIG. 1 depicts an embodiment of a weapon security apparatus from a first angle where the weapon security apparatus is in an unlocked state.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Referring to FIG. 1, an embodiment of a weapon security apparatus 100 is depicted. The apparatus 100 may include a base assembly 110, a handle assembly 120, and a locking assembly 130. The weapon security apparatus 100 may be adapted to hold and secure a wide range of weapons including rifles and shotguns by gripping the weapons above their grips and below their grips without having additional mounting points underneath the butts of the weapons.

The base assembly 110 may include a retractable latch 112. The retractable latch 112 may be moveable between a retracted position and an unretracted position. In the unretracted position, the retractable latch 112 may hold the handle assembly 120 in place, thereby locking a weapon within the locking assembly 130 as described herein.

The handle assembly 120 may include an over-center linkage 122, and a key lock 124. Further, the handle assembly 120 may be moveable between an open position and a closed position. The handle assembly 120 may be configured to actuate the locking assembly 130, such that moving the handle assembly 120 from the open position to the closed position, causes the locking assembly 130 to enter a locked state as described herein.

FIG. 1 depicts the handle assembly 120 in its open position. The over-center linkage 122 may be used to hold, and apply continuous pressure to, a weapon within the locking assembly 130 when the handle assembly 120 is in its closed position. The key lock 124 may be moveable between a locked state and an unlocked state. When in the locked state, the key lock 124 may cause a portion of the handle assembly 120 to be engaged by the retractable latch 112 when the handle assembly 120 is in the closed position. In that way, the locking mechanism 130 may be unlocked either by moving the key lock 124 to the unlocked state or by retracting the retractable latch 112.

The locking assembly 130 may include a first plate 132 and a second plate 134. In the embodiment of FIG. 1, the second plate 134 may be moveable between an open position and a closed position. When in the open position, the locking assembly 130 is in an unlocked state. When the second plate 134 is in the closed position, the locking assembly 130 is in a locked state. To illustrate, when the handle assembly 120 is in its open position, the second plate 134 may be moved away from the first plate 132 leaving room for a weapon to be inserted between the first plate 132 and the second plate 134. When the handle assembly 120 is moved from its open position to its closed position, the second plate 134 may be pushed toward the first plate 132 moving it to the closed position. A weapon may be secured between the first plate 132 and the second plate 134 when the second plate 134 is in its closed position.

One or both of the first plate 132 and the second plate 134 may include a window 136 defined therein. The shape of the window 136 may be suitable to accommodate multiple types of weapons including rifles and shotguns, and may also accommodate attachments to the receivers of the multiple types of weapons. In an embodiment, the first plate 132 and the second plate 134 may have a C-shape. For example, the first plate 132 may have a first member 150 projecting outward at a top portion 140 of the first plate and a second member 152 projecting outward at a bottom portion 142 of the first plate 132. Likewise, the second plate 134 may have a first member 154 projecting outward at a top portion 141 of the second plate 134 and a second member 156 projecting outward at a bottom portion 143 of the second plate 134. The members 150, 152 of the first plate 132 may be connected by a vertical member 160. Likewise, the members 154, 156 of the second plate 134 may be connected by a vertical member 162. The shapes of the first plate 132 and of the second plate 134 are further described herein.

The first plate 132, the second plate 134, or both may include one or more structural posts. In the embodiment of FIG. 1, the first plate 132 may include a first structural post 138 also referred to herein as a first member, a second structural post 139 also referred to herein as a second member, and a third structural post 137 as referred to herein as a third member. Although FIG. 1 depicts the first member, second member, and third member as structural posts, the members may have various shapes, sizes, forms, and configurations that enable a weapon to be secured between and prevent the removal of the weapon from the plates 132, 134.

The structural posts 137, 138, and 139 may prevent the removal of a weapon from the locking assembly 130 when the locking assembly 130 has been engaged. Although FIG. 1 depicts three structural posts 138, 139, 137, other embodiments may include more or fewer structural posts. For example, additional structural posts may exist at the top portion 140 of the first plate 132, the top portion 141 of the second plate 134, the bottom portion 142 of the first plate 132, or the bottom portion 143 of the second plate 134. Further, although FIG. 1 depicts the first plate 132 and the second plate 134 as having a similar or identical shape, in other embodiments, the plates 132, 134 may have different shapes with only one of either the first plate 132 or the second plate 134 being C-shaped.

In order to hold a weapon, a first mount pad 144 may be attached to the top portion 140 of the first plate 132. A second mount pad 146 may be attached to the bottom portion 142 of the first plate 132. Likewise, mount pads may also be attached to the second plate 134.

In order to lock a weapon in place, when the handle assembly 120 is moved to the closed position, the second plate 134 may be moved toward the first plate 132 by the over-center linkage 122, as shown by the arrow 148. The mount pads 144, 146 may be pressed into the weapon above and below a grip of the weapon, thereby holding the weapon firmly in place. Because of the over-center linkage 122, continuous pressure may be applied to the weapon at the mount pads 144, 146. The mount pads 144, 146 may be made of any material capable of compressing to apply continual force on a weapon held between them. For example, the mount pads 144, 146 may include a synthetic rubber.

By retaining a weapon using C-shaped plates 132, 134, the apparatus 100 may be able to accommodate more types of weapons than typical gun locking systems. Further, the apparatus 100 may be able to accommodate attachments to weapons. Additionally, by grasping a weapon using mount pads 144, 146 above and below a grip of the weapon, additional mounting points, such as a butt plate underneath the weapon are not needed. Therefore, the apparatus 100 may omit any structure (e.g., a butt plate) positioned directly beneath a butt portion of a weapon within the apparatus 100. Other advantages of the apparatus 100 may exist.

Figure 2:
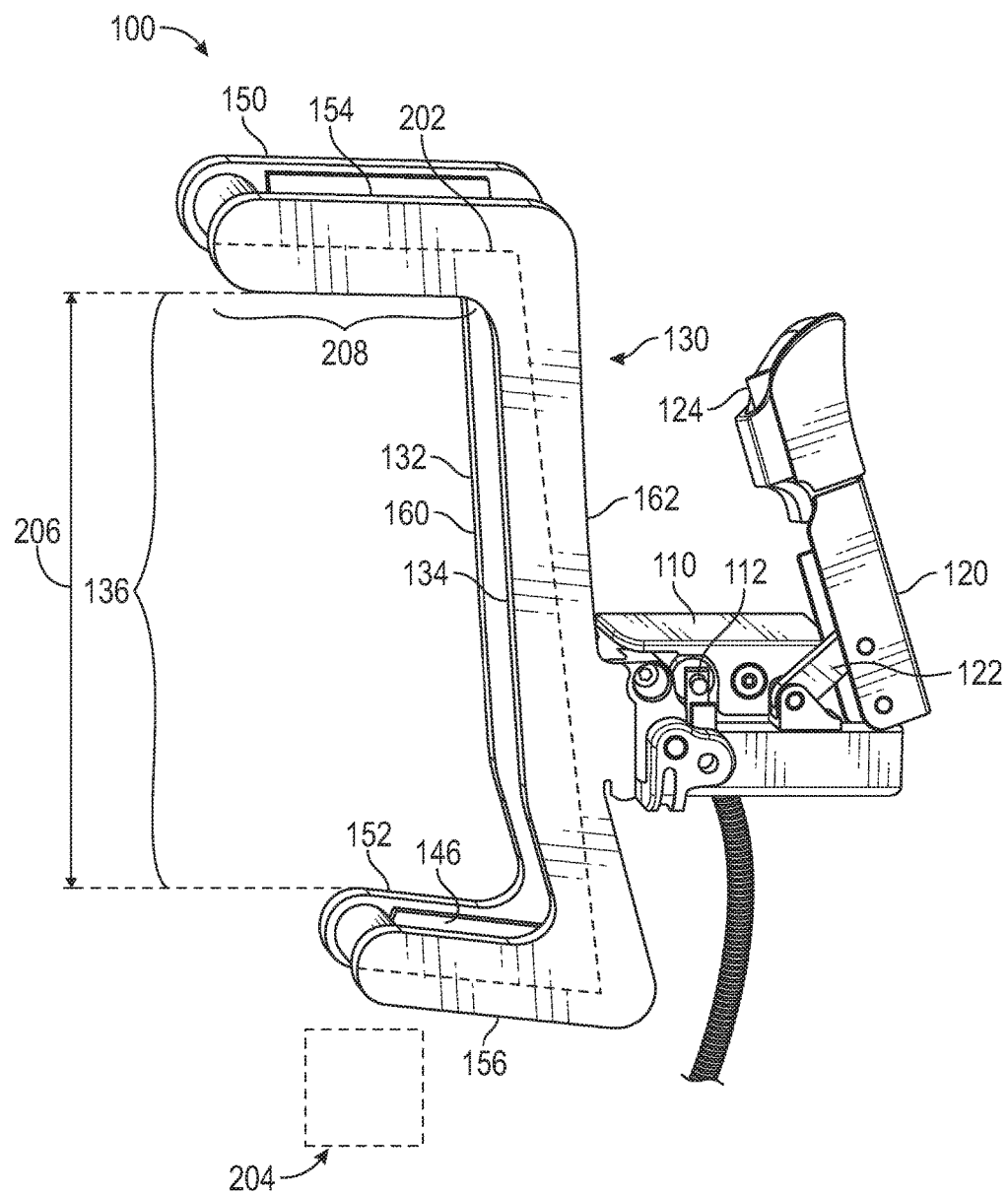
FIG. 2 depicts an embodiment of a weapon security apparatus from a second angle where the weapon security apparatus is in an unlocked state.

Referring to FIG. 2, an embodiment of a weapon security apparatus 100 is depicted. As explained herein, the weapon security system 100 may include a base assembly 110, a retractable latch 112, a handle assembly 120, an over-center linkage 122, a key lock 124, a locking assembly 130, a first plate 132, a second plate 134, a window 136 within at least one of the first plate 132 and the second plate 134, a first mound pad (not shown), and a second mount pad 146.

As depicted by the dotted line 202, the shape of the first plate 132 and the second plate 134 may be a C-shape, with the first plate 132 having substantially horizontal members 150, 152 linked by a substantially vertical member 160 and the second plate 134 having substantially horizontal members 154, 156 linked by a substantially vertical member 162. The shape may enable the plates 132, 134 to retain a weapon both above and below a grip of the weapon while leaving large portions of the weapon open for attachments and extensions. As an example, a height 206 of the window 136 and a width 208 of the window 136 may be sufficiently large to accommodate a side saddle attached to a shotgun. The height 206 and the width 208 may further be predetermined to accommodate other types of extensions that may be added to a weapon.

As described herein, an area 204 underneath the apparatus 100 may exclude any structure to support a weapon. Rather the weapon may be fully supported by the first plate 132 and the second plate 134.

Figure 3:
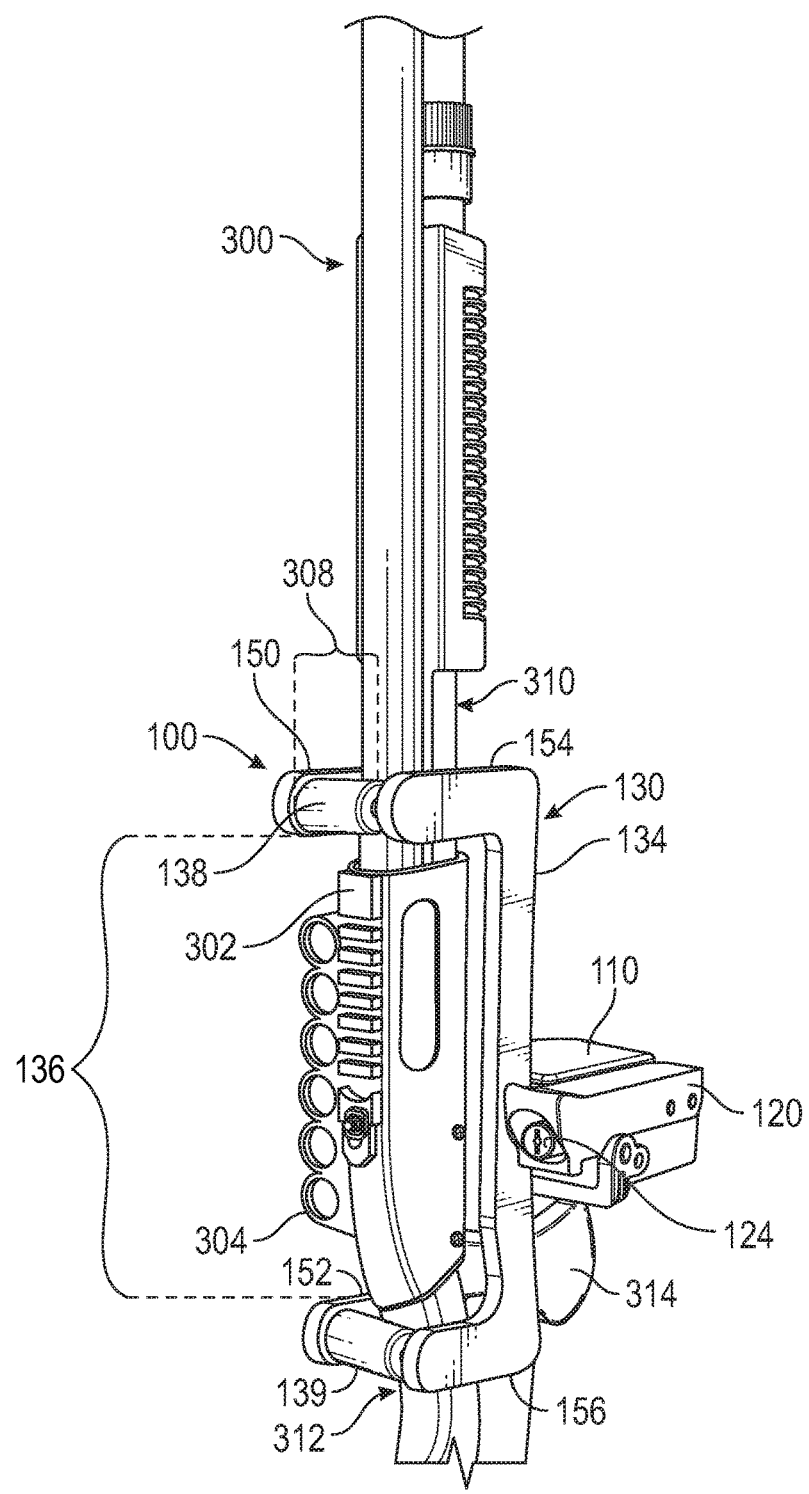
FIG. 3 depicts an embodiment of a weapon security apparatus from a third angle where the weapon security apparatus is securing a weapon in a locked state.

Referring to FIG. 3, an embodiment of a weapon security apparatus 100 is depicted with a weapon 300 retained therein. As described herein, the apparatus 100 may include a base assembly 110, a handle assembly 120, and a locking assembly 130.

In FIG. 3, the handle 120 may be in a closed position and a key lock 124 may be in a locked position. As such, the second plate 134 may be in a locked position and may be retained against the weapon 300. A distance 308 between the plates 132, 134 when in the locked position may be adjustable to accommodate different types and sizes of weapons.

As depicted in FIG. 3, the shape of the plates 132, 134 enables them to retain the weapon 300 both at an area 310 above a grip 314 between the member 150 and the member 154 and at an area 312 below the grip 314 between the member 152 and the member 156. The window 136 may leave a portion of a receiver 302 of the weapon 300 open to accommodate attachments or other extensions of the weapon 300. For example, the weapon 300 may include a side saddle 304 attached to the receiver 302. Further, structural posts 138, 139 may prevent the weapon from being forced out of the plates 132, 134 while the second plate 134 is in the closed position.

Figure 4:
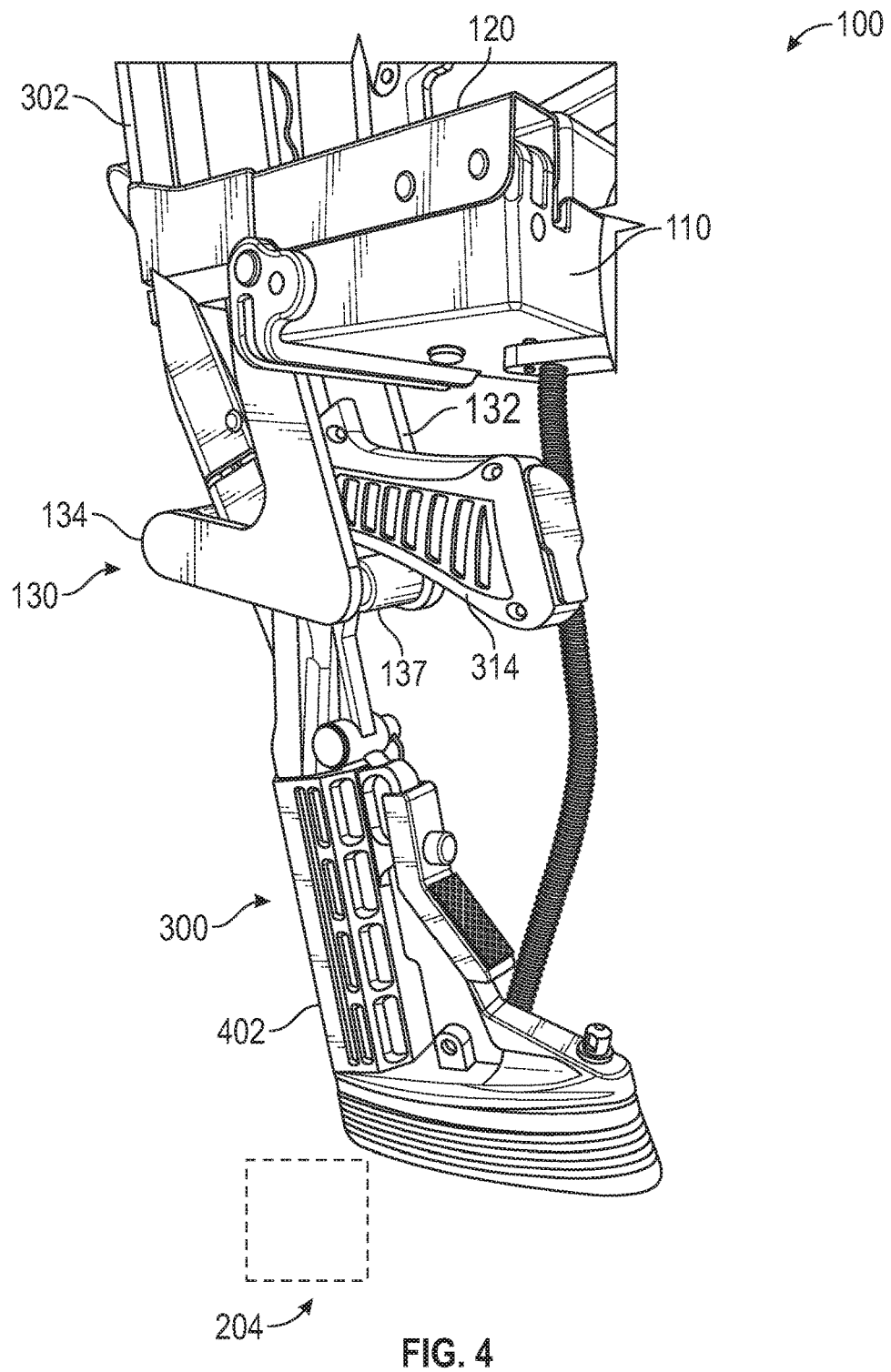
FIG. 4 depicts an embodiment of a weapon security apparatus from a fourth angle where the weapon security apparatus is securing a weapon in a locked state.

Referring to FIG. 4, an embodiment of a weapon security apparatus 100 with a weapon 300 retained therein is depicted from a fourth angle. As explained herein, the apparatus may include a base assembly 110, a handle assembly 120, and a locking assembly 130.

The locking assembly 130 may include a first plate 132 and a second plate 134. As depicted in FIG. 4, the handle assembly 120 may be in a closed position, which in turn forces the second plate 134 into a closed position. While in a closed position, the second plate 134 may compress upon the weapon 300 to hold it in place.

As shown in FIG. 4, the weapon 300 may include a butt portion 402. Unlike typical gun security systems, the apparatus 100 may not include a plate, or any other structure, in an area 204 directly below the butt portion 402 of the weapon 300 while the weapon 300 is retained between the plates 132, 134. Rather, the weapon 300 may be supported by the first plate 132 and the second plate 134.

Additional support may also be provided to the weapon 300 by the structural post 137, which may be positioned below the handle 314. In that way, the structural post 317 may both retain and support weapon 300 while secured by the apparatus 100.

Although various embodiments have been shown and described, the present disclosure is not so limited and will be understood to include all such modifications and variations are would be apparent to one skilled in the art.

What is claimed is:

1. A firearm security apparatus comprising:
   a base assembly;
   a locking assembly having a first plate and a second plate, the second plate moveable between an open position and a closed position relative to the first plate, the first plate and the second plate configured to receive a weapon therebetween, wherein the first plate, the second plate, or both have a top member projecting outward from a vertical member and a bottom member projecting outward from the vertical member to define a C-shape having a window between the top member and the bottom member, wherein the top member engages the weapon above a grip and the bottom member engages the weapon below the grip when the second plate is in the closed position; and
   a structural post coupled to the top member or the bottom member, the structural post configured to engage a weapon when the weapon is positioned between the first plate and the second plate, and when the second plate is in the closed position.

2. The apparatus of claim 1, wherein the first plate and the second plate are configured to hold a weapon without a structure positioned directly beneath a butt portion of the weapon.

3. The apparatus of claim 1, wherein the window is sufficiently large to accommodate, between the first member and the second member, a side saddle extension mounted to a weapon.

4. The apparatus of claim 1, wherein a distance between the first plate and the second plate while the second plate is in the closed position is adjustable to accommodate different sized weapons.

5. The apparatus of claim 1, further comprising a handle configured to enable a user to move the second plate between the open position and the closed position.

6. The apparatus of claim 5, wherein the handle includes an over-center linkage configured to apply continuous pressure to a weapon between the first plate and the second plate when the second plate is in the closed position.

7. The apparatus of claim 1, wherein the first plate and the second plate are comprised of stainless steel.

8. The apparatus of claim 1, further comprising at least one synthetic rubber mount pad attached to the first plate, the second plate, or both.

9. A method for firearm security comprising:
providing a first plate;
providing a second plate, the second plate moveable between an open position and a closed position relative to the first plate, the first plate and the second plate configured to receive a weapon therebetween, wherein the first plate, the second plate, or both have a top member projecting outward from a vertical member and a bottom member projecting outward from the vertical member to define a C-shape having a window between the top member and the bottom member, wherein the top member engages the weapon above a grip and the bottom member engages the weapon below the grip when the second plate is in the closed position; and
providing a structural post coupled to the top member or the bottom member, the structural post configured to engage a weapon when the weapon is positioned between the first plate and the second plate, and when the second plate is in the closed position.

10. The method of claim 9, wherein the first plate and the second plate are configured to hold a weapon without a structure positioned directly beneath and in contact with a butt portion of the weapon.

11. The method of claim 9, wherein the window is sufficiently large to accommodate a side saddle extension mounted to a weapon.

12. The method of claim 9, wherein a distance between the first plate and the second plate while the second plate is in the closed position is adjustable to accommodate different sized weapons.

13. The method of claim 9, further comprising providing a handle configured to enable a user to move the second plate between the open position and the closed position.

14. The method of claim 13, wherein the handle includes an over-center linkage configured to apply continuous pressure to a weapon between the first plate and the second plate when the second plate is in the closed position.

15. The method of claim 9, wherein the first plate and the second plate include stainless steel.

16. The method of claim 9 further comprising providing a first synthetic rubber mount pad attached to the first plate and a second synthetic rubber mount pad attached to the second plate.

17. A firearm security apparatus comprising:
a first plate;
a second plate, the second plate moveable between an open position and a closed position relative to the first plate, the first plate and the second plate configured to receive a weapon therebetween, wherein the first plate, the second plate, or both have a top member projecting outward from a vertical member and a bottom member projecting outward from the vertical member to define a C-shape having a window between the top member and the bottom member, wherein the top member engages the weapon above a grip and the bottom member engages the weapon below the grip when the second plate is in the closed position;
a handle configured to enable a user to move the second plate between the open position and the closed position, wherein the handle includes an over-center linkage configured to apply continuous pressure to a weapon between the first plate and the second plate when the second plate is in the closed position; and
a structural post coupled to the top member or the bottom member, the structural post configured to engage a weapon when the weapon is positioned between the first plate and the second plate, and when the second plate is in the closed position.

* * * * *